May 30, 1967 C. R. STEVENS 3,321,983
TILTING BAR ALTERNATE ACTION SWITCH MECHANISM
Filed Jan. 4, 1965 3 Sheets-Sheet 1
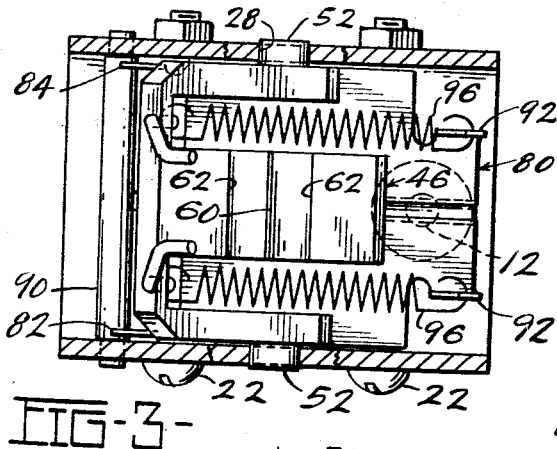
FIG-3-
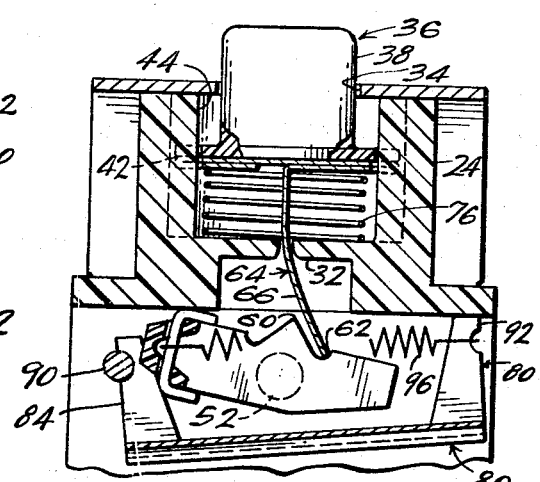
FIG-4-
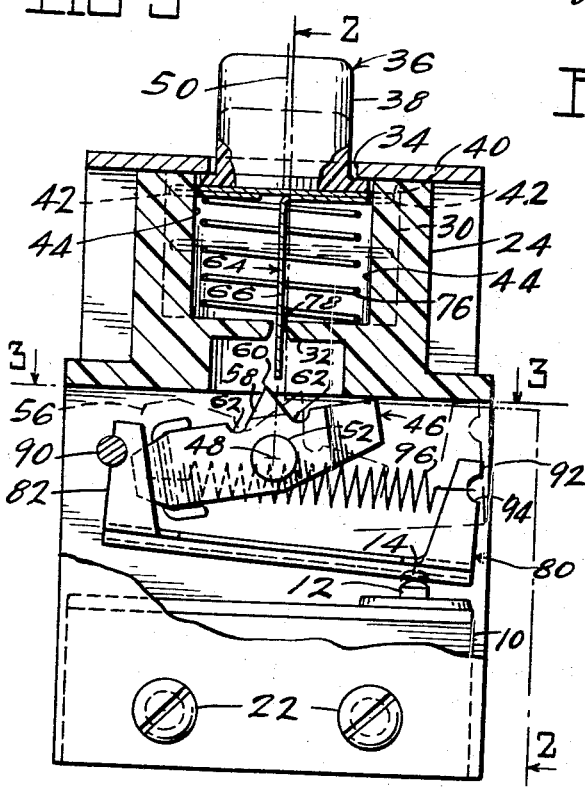
FIG-1-
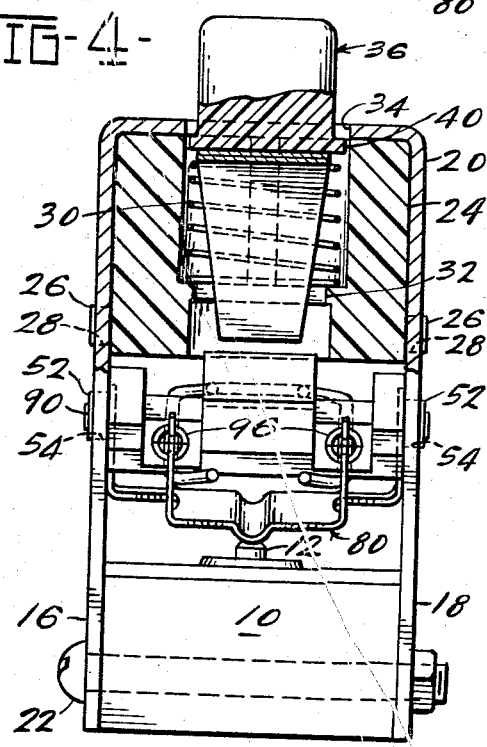
FIG-2-
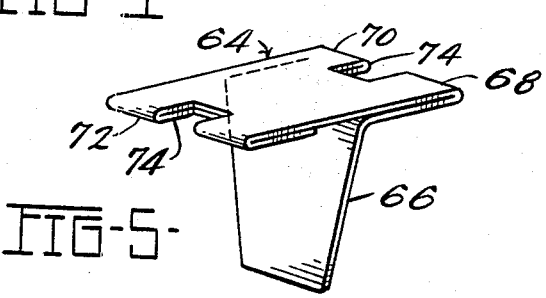
FIG-5-
INVENTOR:
CURTIS R. STEVENS.
BY
ATT'YS.

May 30, 1967 C. R. STEVENS 3,321,983
TILTING BAR ALTERNATE ACTION SWITCH MECHANISM
Filed Jan. 4, 1965 3 Sheets-Sheet 2
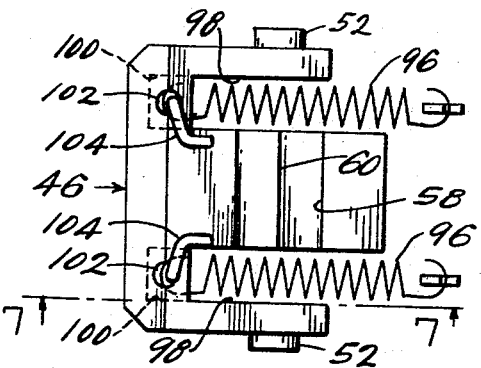
FIG-6-
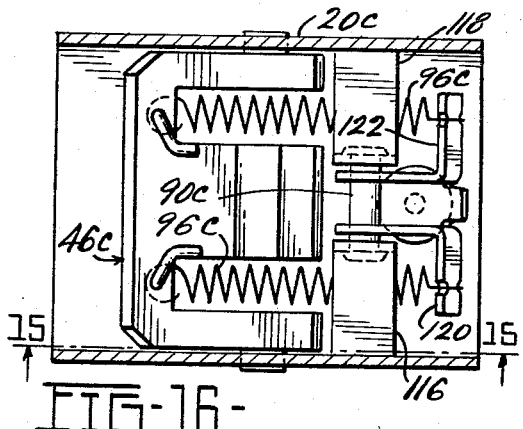
FIG-16-
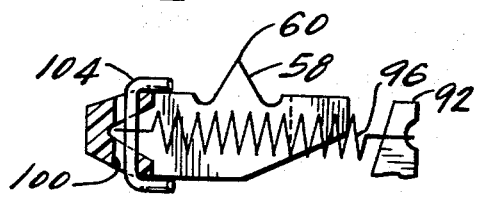
FIG-7-
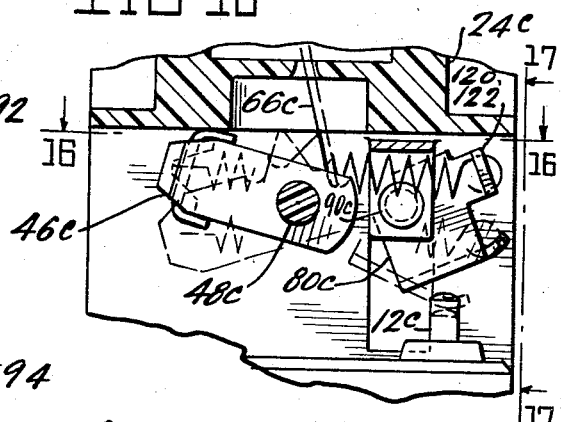
FIG-15-
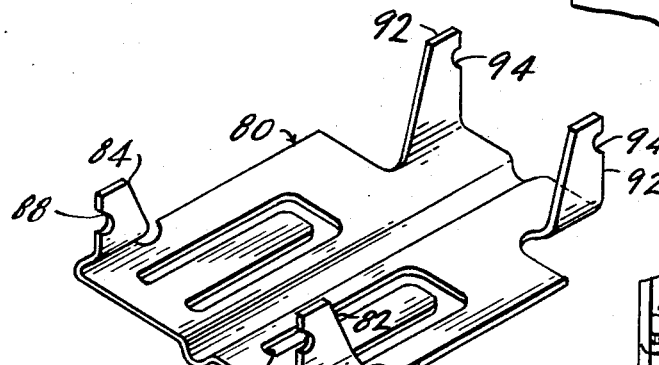
FIG-8-
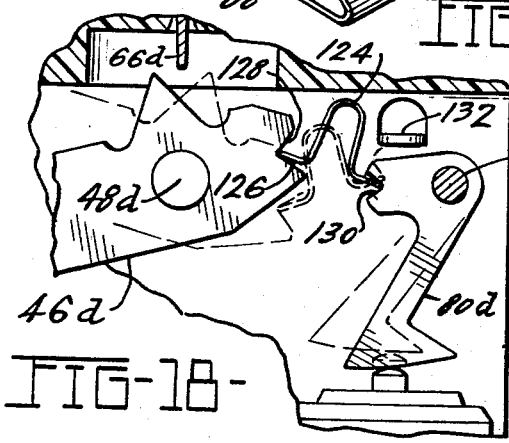
FIG-18-
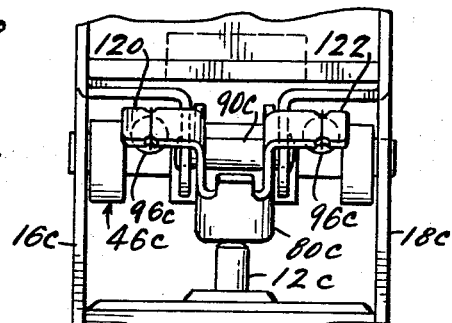
FIG-17-
INVENTOR:
CURTIS R. STEVENS.
BY
ATT'YS.

May 30, 1967  C. R. STEVENS  3,321,983
TILTING BAR ALTERNATE ACTION SWITCH MECHANISM
Filed Jan. 4, 1965  3 Sheets-Sheet 3
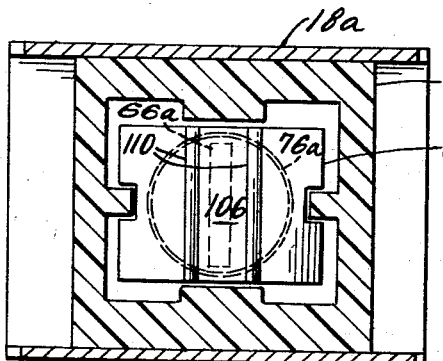
FIG-11-
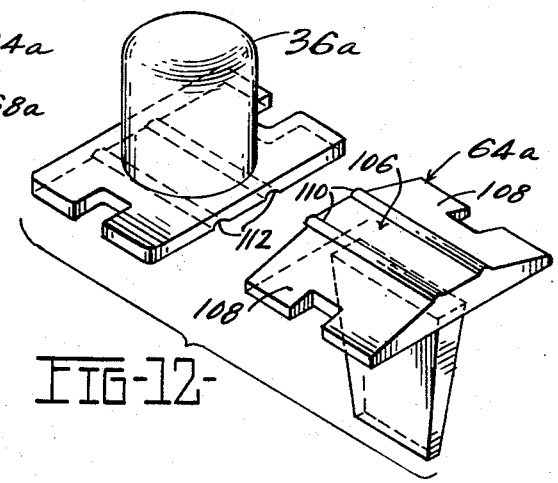
FIG-12-
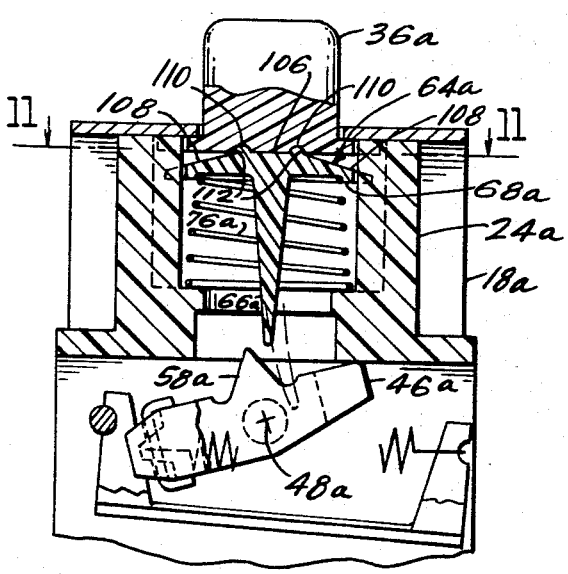
FIG-9-
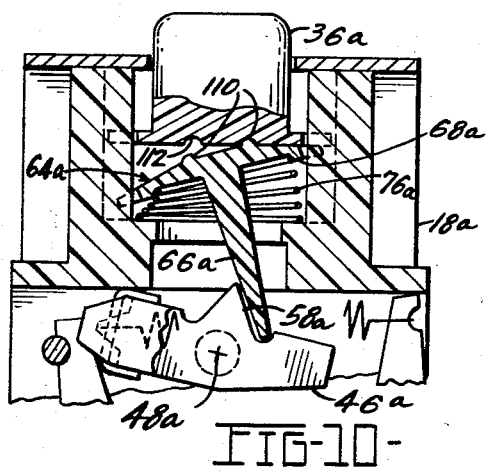
FIG-10-
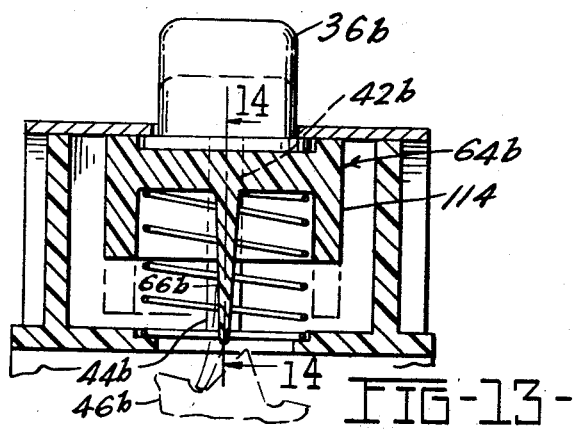
FIG-13-
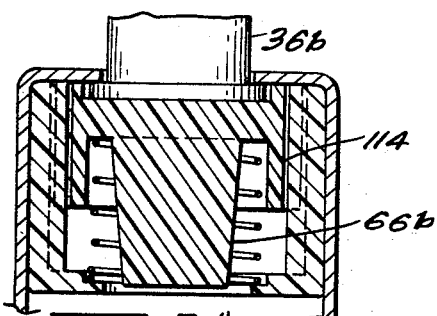
FIG-14-
INVENTOR:
CURTIS R. STEVENS.
BY
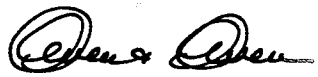
ATT'YS.

United States Patent Office 3,321,983
Patented May 30, 1967

3,321,983
TILTING BAR ALTERNATE ACTION
SWITCH MECHANISM
Curtis R. Stevens, La Mirada, Calif., assignor to Master Specialties Company, Gardena, Calif., a corporation of California
Filed Jan. 4, 1965, Ser. No. 423,170
3 Claims. (Cl. 74—100)

This invention relates to an alternate action switch mechanism which will cause an actuation bar to move in one position upon one inward movement of a push button, and which will cause the actuation bar to move into a second position upon a second inward movement of the push button; and more particularly to a switch mechanism which is alternately opened and closed upon successive inward movements of the push button by means of new and improved structure.

The principal object of the present invention is the provision of a new and improved alternate action mechanism which involves a minimum of simple parts, which is efficient in its operation, and which is inexpensive to manufacture.

A more particular object of the present invention is the provision of a new and improved switch structure having the features above described and the contacts of which are moved with a snap action to their open and closed positions upon successive inward movements of a push button by means of alternate action mechanism.

The invention resides in certain constructions and combinations and arrangements of parts, and further objects and advantages of the invention will become apparent to those skilled in the art to which it relates from the following description of several preferred embodiments described with reference to the accompanying drawings forming a part of this specification, and in which:

FIGURE 1 is a side elevational view with portions broken away and sectioned of a switch structure embodying principles of the present invention;

FIGURE 2 is an end view of the structure shown in FIGURE 1 with portions broken away as seen from a position indicated generally by the line 2—2 of FIGURE 1;

FIGURE 3 is a cross-sectional view taken along the line 3—3 of FIGURE 1;

FIGURE 4 is a top fragmentary sectional view showing the upper portions of the mechanism seen in FIGURE 1, but with the alternate action mechanism in its second position;

FIGURE 5 is an isometric view of an actuation blade seen in FIGURES 1, 2, and 4;

FIGURE 6 is a fragmentary view of the rocker arm and spring structure seen in FIGURES 1 through 4;

FIGURE 7 is a fragmentary sectional view taken approximately along the line 7—7 of FIGURE 6;

FIGURE 8 is an isometric view of a tiltable switch actuation arm seen in FIGURES 1 through 4;

FIGURE 9 is a fragmentary sectional view similar to the upper portion of FIGURE 1, but showing another embodiment of the switch actuation structure;

FIGURE 10 is a fragmentary sectional view similar to FIGURE 9, but showing the switch actuation structure as the parts exist when the structure is moved to its alternate position;

FIGURE 11 is a sectional view taken approximately on the line 11—11 of FIGURE 9;

FIGURE 12 is an isometric view of the actuating button and a blade structure which cooperate to rock the rocker arm of the alternate action mechanism shown in FIGURES 9 and 10 between their alternate positions;

FIGURE 13 is a fragmentary sectional view generally similar to FIGURES 4 and 9 but showing another embodiment of the invention;

FIGURE 14 is a sectional view taken along the line 14—14 of FIGURE 13;

FIGURE 15 is a fragmentary sectional view through the centerline through a switch structure comprising still another embodiment of alternate action mechanism;

FIGURE 16 is a sectional view taken approximately on the line 16—16 of FIGURE 15;

FIGURE 17 is an end elevational view as seen from the line 17—17 of FIGURE 15; and FIGURE 18 is a view similar to FIGURE 15, but showing still another embodiment of switch actuating alternate action mechanism.

The alternate action mechanism of the present invention generally comprises a rocker arm that is rockable about a fixed transverse axis between alternate inclined positions and a blade guided for movement toward and away from said rocker arm along a path which when extended intercepts the transverse axis. The rocker arm is provided with an inverted V-shaped projection centered on the path of the blade so that the opposite side faces of the inverted V-shaped projection can be brought into alignment with the path of movement of the blade as the rocker arm is rocked between its alternae positions. The free end of the blade is adapted to abut the respective side surfaces of the projection when in alignment with the blade, and the free end of the blade is movable laterally relative to the axis of the rocker arm during movement toward the rocker arm so as to slide down the aligned side of the projection and tilt the rocker arm into a position wherein the other side surface is aligned with the free end of the blade. The next movement of the blade toward the rocker arm engages said other side surface of the projection and moves the rocker arm back to its original position.

The switch structure shown in FIGURES 1 through 5 of the drawings comprises a plastic contact supporting block 10, the contacts (not shown) of which are caused to be closed when the push button 12 is in its depressed condition shown by the solid lines in FIGURE 1, and which are caused to be in their opened condition when the push button 12 is in the upper position shown by the dotted lines 14 in FIGURE 1. The lower ends of the legs 16 and 18 of a U-shaped sheet metal bracket 20 are positioned over the opposite lateral side surfaces of the block 10 and secured in place by means of through bolts 22. A plastic block 24 is secured in the upper end of the bracket 20 at a location spaced apart from the block 10 and is held in place by means of four integrally formed projections 26 of the plastic block 24 which extends through receiving openings 28 in the opposite lateral side legs 16 and 18 of the bracket 20. The upper end of the plastic block 24 has a centrally located chamber 30 therein of generally rectangular cross section which terminates short of the lower end of the block 24 so that a bottom wall 32 is provided. A cylindrical opening 34 is provided in the top portion of the bracket 20 which overlies the chamber 30, and an actuating push button 36 is so located that a cylindrical portion 38 thereof projects outwardly through the opening 34, and a flange portion 40 thereof is slidingly received within the chamber 30 beneath the top portion of the bracket 20. The flange 40 has a pair of recesses 42 therein to receive vertical guide ridges 44 that project into the chamber 30 from the sides of the chamber that parallel the opposite ends of the switch structure.

A rocker arm 46 is positioned between the blocks 10 and 24 for tilting movement about a transverse axis 48 that is located on the vertical centerline 50 of the actuating button 36 and chamber 30. The rocker arm 46 may be shaped and supported in any suitable manner, and as shown in the drawings is provided with integrally formed laterally extending trunnions 52 which project through and are journaled in receiving openings 54 in the legs 16 and 18 of the bracket 20. The rocker arm 46 is movable from a first inclined position shown by the solid lines in FIGURE 1, through a neutral or center position wherein the rocker arm extends generally normal to the centerline 50, to a second tilted position shown by the dotted lines 56 in FIGURE 1. The rocker arm 46 has an inverted V-shaped projection 58 on its upper surface beneath the chamber 30, and which is so located that the apex 60 thereof is located on the centerline 50 when the rocker arm 46 is in its center position. The rocker arm 46 is notched out adjacent the lower ends of the sloping side surfaces of the projection 58 to provide abutment surfaces 62 for reasons which will later be apparent.

The rocker arm 46 is adapted to be moved between its first and second tilted positions above referred to upon alternate inward movements of the button 36 by means of an actuation blade 64 which can be seen in FIGURES 1, 2, and 4, and an isometric view of which is shown in FIGURE 5. The actuation blade 64 has a transversely extending blade portion 66 that is located on the centerline 50 passing through the axis 48, and which is movable towards the rocker arm 46 along a path extending generally lengthwise of the centerline 50. The actuation blade 64 may be made in various ways so long as the lower end of the blade 66 is movable to opposite sides of the axis 28 as will be necessary when the lower end of the blade portion 66 abuts the side surfaces of the inverted V-shaped projection 58. In the embodiment shown in FIGURES 1, 2, 4, and 5, the actuating blade 64 is made of a spring material, the lower end of which is bendable, and the upper end of which is bent transversely to the blade portion 66 and then backwardly upon itself to provide a stiffened flange portion 68 which is slidably guided in the chamber 30 and which is abutted by the actuating button 36. The opposite side portions 70 and 72 of the flange 68 are notched out as at 74 to receive the guide ridges 44 to thereby prevent rotation of the actuating blade 64. The actuating blade 64 is normally held in the upper position shown by the solid lines in FIGURE 1 by means of a coil spring 76 positioned between the bottom wall 32 and the under surface of the flange portion 68. When in the upper position shown in FIGURE 1, the bottom end of the blade portion 66 is spaced slightly upwardly of the apex 60 of the rocker arm 46. The blade portion 66 projects through a slot 78 in the bottom wall 32 on the centerline 50 and extends along the centerline 50 towards the axis 28 of the rocker arm 46 to intercept the opposite side surfaces of the V-shaped projection 58. The side surfaces of the slot 78 guide the blade portion 66 for movement along this path, and the bottom wall 32 is spaced a sufficient distance from the projection 58 to permit the lower end of the blade structure 66 to bend and slide along the side surfaces of the projection 58 into abutment with the surfaces 62.

Movement of the rocker arm between its first and second positions above described, is caused to actuate the push button 12 through a tilt bar 80. The tilt bar 80 may be formed in various ways so long as it is tiltable about an axis parallel to the axis 28 for rocking movement toward and away from the button 12. In the embodiment shown in FIGURES 1 through 4 and 8, side portions 82 and 84 of a sheet metal strip 86 are bent upwardly, and the end surfaces of the upwardly turned portions 82 and 84 are notched out as at 88 to receive a transverse pin 90 that is parallel to the axis 28 and which extends through suitable openings in the side legs 16 and 18 of the brackets 20. In the embodiment shown in FIGURES 1 through 4 and 8, the pin 90 is located to one side of the rocker arm 46 and a pair of upwardly bent legs 92 are provided on the opposite side of the rocker arm 46. The legs 92 have notches 94 in their sides facing away from the legs 82 and 84. A pair of coil springs 96 are stretched between the respective ones of the notches 94 in the legs 92 and portions of the rocker arm 46 positioned between the axis 28 and pin 90. This can best be seen in FIGURES 6 and 7. The rocker arm 46 contains laterally extending recesses 98 which extend across the axis 28, and respective ones of which receive respective springs 96. The recesses 98 end in V-shaped areas 100 (see FIG. 7) which undercut top and bottom portions of the side of the rocker arm 46 positioned between the axis 28 and pin 90 to receive the hooked ends of the respective springs 96. Openings 102 extend through the respective undercut portions of the rocker arm 46 to receive generally U-shaped pins 104 each of which extend through a hook portion of a respective spring 96 that is located in the respective V-shaped portion 100 of the recesses 98. The pins 104 are inserted through the openings 102 with their legs facing away from the rocker arm 46 and are then rotated approximately 180° to cause the top and bottom legs of the U-shaped pins 104 to frictionally engage the top and bottom portions of the rocker arm 46 (see FIG. 6) to lock the pins in place. The geometry of the rocker arm 46 and tilt bar 80 is such that the line of force of the springs 96 passes over the axis 28 when the tilt bar 80 is moved from its solid position as seen in FIGURE 1 to the dotted position 56 as seen in FIGURE 1. This causes the rocker arm 46 to snap into its second position 56 and at the same time bias the tilt arm 80 into its upper position as shown by the dotted lines in FIGURE 1.

The rocker arm 46 is moved from the position shown by the solid lines in FIGURE 1 to its dotted position 56 by depressing the actuating button 36 to its dotted position. The inner end of the blade 66 is thereby moved against one side surface of the V-shaped projection 58 and is caused to slide along the side surface into engagement with the abutment surface 62 following which it is rocked to the dotted position 56 of FIGURE 1. During this movement the line of force of the spring passes over the axis 28 to snap the rocker arm 46 into its second position 56 and simultaneously move the tilt bar 80 into its upper position wherein the legs 92 engage the bottom of the block 24. An alternate action which moves the rocker arm from its position 56 to the solid position shown in FIGURE 1 occurs on the next inward movement of the actuating button 36 which causes the blade 66 to slide down the other side of the V-shaped projection 58 and move the rocker arm 46 into its first position. During this movement, the line of force of the springs 96 pass over the axis 28 to thereby pull the tilt bar 80 into its lower position wherein it depresses the switch button 12.

The embodiment shown in FIGURES 9 through 12 of the drawings corresponds generally to the embodiment previously described, but differs principally therefrom in that the inner end of its actuating blade does not bend, but is caused to move transversely of the axis 28 through a rocking action between the actuating blade and the push button. Those portions of the embodiment shown in FIGURES 9 through 12 which are similar to corresponding portions of the embodiment shown in FIGURES 1 through 8 are designated by a like reference numeral characterized further in that a suffix *a* is affixed thereto.

The actuation blade 64a has a rigid blade portion 66a and a rigid flange portion 68a. The top surface of the flange portion 68a has a substantially flat center portion 106 which is normally abutted by the actuating button 36a. The portions 108 of the top surface positioned on opposite sides of the flat center portion 106 are inclined inwardly away from the actuating button 36a so as to permit rocking action of the actuation blade 64a relative to the actuating button 36a by an amount which permits the lower end of the blade portion 66a to move transversely of the axis 28a a sufficient distance to rock the rocker arm 46a between its first and second positions. The actuating push button 36a and actuating blade 64a are loosely interlocked to prevent relative sidewise movement by means of a projection and groove arrangement in the abutting surfaces. In the embodiment shown in the drawings, projections 110 are provided on the actuating blade 64a at the opposite edges of the top flat center portion 106 of its surface, and receiving grooves 112 are provided in the bottom surface of the push button 36a to receive the projections 110. The coil spring 76a normally holds the flat center portion 106 of the actuating blade against the actuating push button 36a so that the blade 66a moves on a path along the axis 50 until it engages the side surfaces of the V-shaped projection 58. Thereafter the actuating blade 64a rocks about a projection 110 to accommodate the necessary transverse movement of the inner end of the actuating blade 66a as it moves the rocker arm 46a between its first and second positions.

The embodiment shown in FIGURES 13 and 14 of the drawings is quite similar to the embodiment shown in FIGURES 1 through 8 but differs principally therefrom in that the actuating blade structure is formed from plastic in a manner providing a flexible blade and a relatively stiff top portion that is guided by the side surfaces of a receiving guide block. Those portions of the embodiment shown in FIGURES 13 and 14 which are similar to corresponding portions of the embodiment shown in FIGURES 1 through 8 are designated by a like reference numeral characterized further in that a suffix b is affixed thereto. The plastic actuating blade 64b has an upper portion containing depending skirts 114 thereon the outer surfaces of which contain recesses 42b which receive the guide ridges 44b to prevent tilting of the top portion of the actuating blade 64b. The bottom portion of the blade 66b, however, is flexible and bends transversely by a sufficient amount to permit the necessary rocking movement of the rocker arm 46b.

The embodiment shown in FIGURES 15 through 17 of the drawings involves generally the same parts as is used in the previously described embodiments, but differs principally therefrom in that the axis about which the tilt blade rocks is positioned to the opposite side of the axis of the rocker arm from the location that occurs in the previously described embodiments. This arrangement has the advantage in that the line of force for the spring sequentially passes over the axis of the rocker arm, and then over the axis of the tilt bar to sequentially snap the rocker arm and tilt bar into their alternate positions. Those portions of the embodiment shown in FIGURES 15 through 17 which are similar to corresponding portions of the previously described embodiments are designated by a like reference numeral characterized further in that a suffix c is affixed thereto. The tilt bar 80c is supported from the bracket 20c by a pin 90c that extends through openings in inwardly bent leg portions 116 and 118 of the bracket 20c. The tilt bar 80c is a generally U-shaped sheet metal member one end of which is journaled to the pin 90c and the opposite end of which is positioned remotely from the rocker arm 46c. The tilt bar 80c is provided with laterally extending legs 120 and 122 over which the ends of respective springs 96c are fixed. The outer bottom end of the tilt bar 80c is adapted to abut the push button 12c to move it into its contact closing inner position. The points of attachment of the springs 96c to the rocker arm 46c and the tilt bar 80c are such that when the tilt bar is in its lower position and the rocker arm 46c is moved from its first to its second position, the line of force of the springs 96c sequentially pass over the axis 28c and then over the axis of the pin 90c to sequentially snap the rocker arm into its second position, and thereafter snap the tilt bar 80c into its upper position. This allows the switch button 12c to move to its outer position to open the contacts of the switch. When the rocker arm 46c is moved from its upper second position into its lower first position and the tilt bar is in its upper position, the line of force of the springs 96c sequentially pass over the axis 28c and the axis of the pin 90c to sequentially snap both the rocker arm 46c and the tilt bar 80c into their lower positions.

The embodiment shown in FIGURE 18 of the drawings is generally similar to the embodiment shown in FIGURES 15 through 17 above described, but differs principally therefrom in that a compression type of spring is used instead of the tension spring 96c. Those portions of the embodiment shown in FIGURE 18 which are similar to corresponding portions of the above mentioned embodiment are designated by a like reference numeral characterized further in that a suffix d is affixed thereto. The compression spring 124 shown in the drawings is a generally U-shaped spring having opposite outwardly turned legs 126 each of which are received in a retaining groove 128 and 130 in the rocker arm 46d and the tilt bar 80d, respectively. As occurs in the previously described embodiment the line of force between the ends of the legs 126 passes sequentially over the axis 28d and 90d as the rocker arm 46d is moved from the lower position as seen in FIGURE 18 to the upper dotted position seen in FIGURE 18. This causes the rocker arm 46d to snap into its upper position and the tilt bar 80d to snap into the upper position shown by means of dotted lines in FIGURE 18. When the members are moved from the dotted positions to their solid positions as shown in FIGURE 18, the line of force of the springs again sequentially passes over the axis 28d and the axis of the pin 90d to repeat the sequential snap action above described. The upward movement of the tilt bar is limited by a stop 132 formed by bending a leg outwardly from the bracket 20d.

While the invention has been described in considerable detail, I do not wish to be limited to particular embodiments shown and described, and it is my intention to cover hereby all novel adaptations, modifications and arrangements thereof which come within the practice of those skilled in the art to which the invention relates.

Having described my invention I claim:

1. In an alternate action mechanism: a housing, a rocker arm; means pivotally supporting said rocker arm from said housing for rocking action about an axis transverse to said rocker arm; a push blade positioned to one side of said rocker arm generally parallel to said axis, said blade being movable from an outer position along a predetermined path toward said axis; said rocker arm having a neutral position generally normal to said path, a first tilted position wherein one end of said rocker arm is spaced to the side of said neutral position opposite from said push blade, and a second tilted position wherein said one end of said rocker arm is spaced toward said push blade from said neutral position; said rocker arm having a generally inverted V-shaped projection facing said push blade with the apex of said projection being located on said path when said rocker arm is in said neutral position, said inverted V-shaped projection having side surfaces that include actuating portions which remain on respective sides of said axis in both of said first and second tilted positions of said rocker arm, at least the tip of said blade being movable laterally from said path so that said tip slides down one side of said projection against its actuating portion to tilt said rocker arm from one of said first and second positions to the other, an elongated tilt bar supported for tilting movement between first and second inclined positions about an axis parallel to said first-mentioned axis, said tilt bar extending transversely of the direction of movement of said push blade for all positions of said tilt bar and having means located to one side of the path of said push blade and beyond an end of said rocker arm for engaging and closing switch means, and spring means operatively positioned to apply a biasing force to said tilt bar and to said rocker arm on a line which moves to one side of said first-mentioned axis when said tilt bar is in one position and said rocker arm is moved from its first position to its second position, and which moves to the other side of said first-mentioned axis when said tilt bar is in its other position and said rocker arm is moved from its second position to its first position.

2. An alternate action switch mechanism comprising a housing, an elongate rocker arm, means pivotally supporting a central portion of said rocker arm from said housing for rocking action about an axis transverse to said rocker arm, a push blade positioned to one side of said rocker arm, said blade being movable from an outer position along a predetermined path toward said rocker arm axis, said rocker arm having a neutral position generally normal to said path, a first tilted position wherein one end of said rocker arm is spaced to the side of said neutral position opposite from said push blade, and a second tilted position wherein said one end of said rocker arm is spaced toward said push blade from said neutral position, said rocker arm having a generally inverted V-shaped projection facing said push blade with the apex of said projection being located on said path when said rocker arm is in said neutral position, said inverted V-shaped projection having side surfaces which include actuating portions which remain on respective sides of said axis in both of said first and second tilted positions of said rocker arm, at least the tip of said blade being movable transversely from said path so that said tip slides down one side of said projection against its actuating portion to tilt said rocker arm from one of said first and second positions to the other position, a tilt bar positioned transversely to the path of said push blade, means pivotally supporting said tilt bar from said housing for rocking action about an axis which is parallel to and spaced from said rocker arm axis, with a line through said rocker arm axis and said tilt bar axis being substantially perpendicular to the path of said push blade, a spring having one end engaged with one end of said rocker arm, with the other end of said spring engaged with a portion of said tilt bar spaced from said tilt bar pivot axis, said spring being positioned to direct force on said tilt bar to one side of said rocker arm axis when said rocker arm is in the first position, and to direct force on said tilt bar to the other side of the rocker arm axis when said rocker arm is in the second position, said tilt bar having means for engaging a switch located beyond said rocker arm outwardly from the path of said push blade.

3. An alternate action switch mechanism comprising a housing, an elongate rocker arm, means pivotally supporting said rocker arm from said housing for rocking action about an axis transverse to said rocker arm, said rocker arm having a neutral position, a first tilted position wherein one end of said rocker arm is spaced to one side of said neutral position, and a second tilted position wherein said one end of said rocker arm is spaced to the opposite side of said neutral position, a push blade positioned to one side of said rocker arm and movable from an outer position along a predetermined path toward said rocker arm axis, an elongate tilt bar tiltably supported on a second axis extending parallel to and spaced from said first axis, said tilt bar being tiltable between first and second positions, said tilt bar extending transversely to the path of said push blade for all positions of said tilt bar, a line through said axes extending transversely to the path of said push blade for all positions of said tilt bar, said tilt bar having means for engaging a switch located beyond an end of said rocker arm outwardly from the path of said push blade, and spring means operatively positioned to apply biasing force to said tilt bar and to said rocker arm on a line which moves to one side of said first-mentioned axis when said tilt bar is in one position and said rocker arm is moved from its first position to its second position, and which moves to the other side of said first-mentioned axis when said tilt bar is in its other position and said rocker arm is moved from its second position to its first position.

References Cited
UNITED STATES PATENTS

| | | | |
|---|---|---|---|
| 1,192,531 | 7/1916 | Kitchen | 74—100 X |
| 1,966,285 | 7/1934 | Deans | 200—153 |
| 2,601,545 | 6/1952 | Miller | 200—153.9 X |
| 2,623,960 | 12/1952 | Haydon | 74—100 X |
| 2,684,418 | 7/1954 | Koch | 74—100 X |
| 3,051,810 | 8/1962 | Walstrom | 200—153.9 |

MILTON KAUFMAN, *Primary Examiner.*

FRED C. MATTERN, *Examiner.*

F. E. BAKER, *Assistant Examiner.*